US006945865B1

(12) United States Patent  
Turek

(10) Patent No.: US 6,945,865 B1  
(45) Date of Patent: Sep. 20, 2005

(54) AIR RETURN BULKHEAD

(75) Inventor: James R. Turek, Indianapolis, IN (US)

(73) Assignee: Illinois Tool Works, Inc., Glenview, IL (US)

( * ) Notice: Subject to any disclaimer, the term of this patent is extended or adjusted under 35 U.S.C. 154(b) by 267 days.

(21) Appl. No.: 10/366,706

(22) Filed: Feb. 14, 2003

Related U.S. Application Data

(63) Continuation of application No. 09/522,851, filed on Mar. 10, 2000, now abandoned.

(51) Int. Cl.$^7$ .................................................. B60H 1/32
(52) U.S. Cl. ............................ 454/118; 62/407; 454/91
(58) Field of Search .............................. 454/88, 90, 91, 454/118; 62/239, 329, 407, 413, 414; 410/121, 129

(56) References Cited

U.S. PATENT DOCUMENTS

| 2,909,234 | A | 10/1959 | Belk |
| 4,279,439 | A | 7/1981 | Cantieri |
| 4,399,737 | A | 8/1983 | Severson |
| 4,495,857 | A | 1/1985 | Morgan |
| 4,539,239 | A | 9/1985 | Graves et al. |
| 4,801,169 | A | 1/1989 | Queen et al. |
| RE33,200 | E | 4/1990 | Reynolds et al. |
| 5,164,238 | A | 11/1992 | Horiki et al. |
| 5,167,433 | A | 12/1992 | Ryan |
| 5,769,704 | A | 6/1998 | Henning et al. |
| 5,807,046 | A | 9/1998 | Onken |
| 5,947,812 | A | 9/1999 | Henning et al. |
| 5,993,310 | A | 11/1999 | Onken |
| 6,132,307 | A | * 10/2000 | Wills ........................ 454/118 |
| 6,296,561 | B1 | 10/2001 | Ziegler et al. |
| 6,364,388 | B1 | 4/2002 | Ziegler et al. |

* cited by examiner

Primary Examiner—Harold Joyce
(74) Attorney, Agent, or Firm—Banner & Witcoff, Ltd.

(57) ABSTRACT

An improved air return bulkhead for mounting on the wall of a refrigeration vehicle that carried a refrigeration unit, comprising a synthetic plastic unitary body including a generally rectangular vertical first wall having top, bottom and side edges to which are connected top, bottom and side walls that cooperate with the internal surface of the vehicle wall to define a plenum chamber. Air is drawn into the plenum chamber via apertures contained in the bottom wall for communication with the inlet of the refrigeration unit. The bottom wall of the air return bulkhead is arranged at an obtuse internal angle relative to the first wall, at least one support being provided on the interior surface of the bottom wall in downwardly spaced relation relative to the bottom edge of the first wall, the support being arranged to engage the interior surface of the vehicle wall, thereby to support the bottom wall of the air return bulkhead. Preferably, the bottom wall contains a plurality of apertures each having a rectangular configuration, the apertures being arranged in two horizontal rows with the apertures of one row being staggered relative to the apertures of the other row. According to the preferred embodiment of the invention, a plurality of supports may be provided in horizontally space relation on the bottom wall, each of the supports being in the form of a recess contained in the external face of the bottom wall. Each of the support recesses includes a vertical bottom wall arranged for face-to-face supported engagement with the vehicle wall.

31 Claims, 3 Drawing Sheets

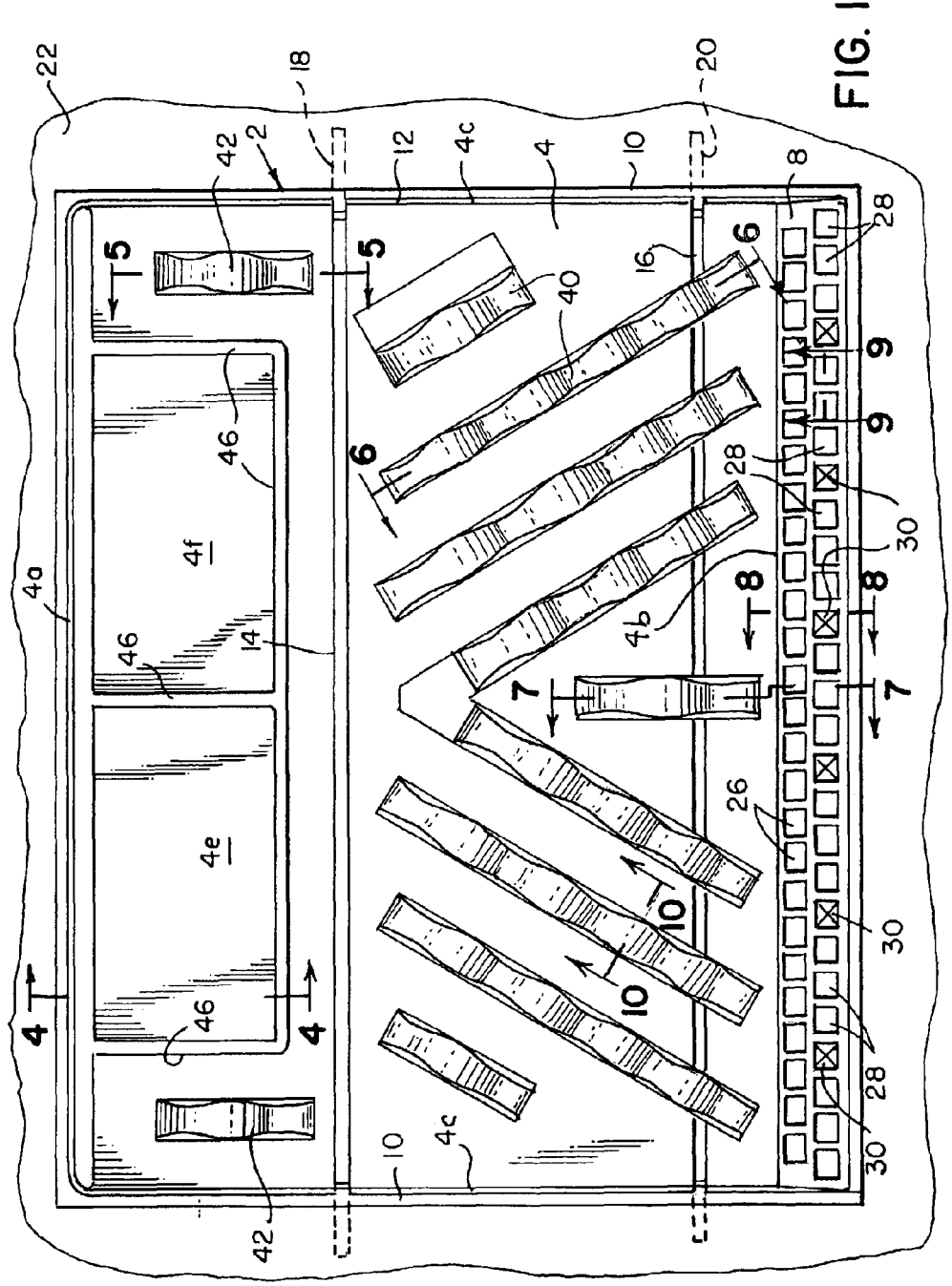

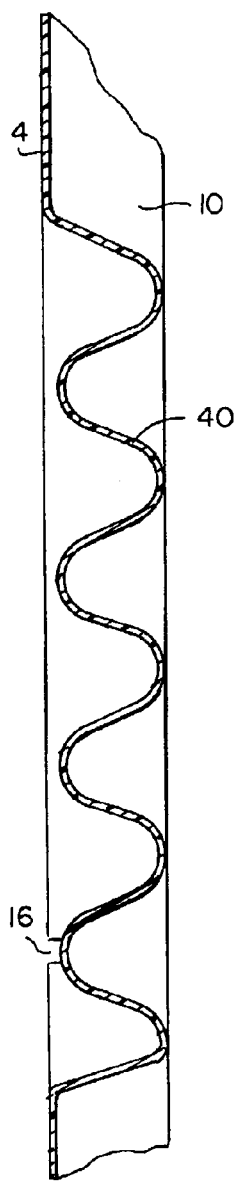
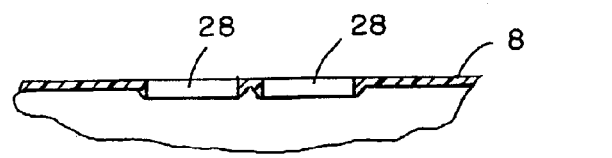
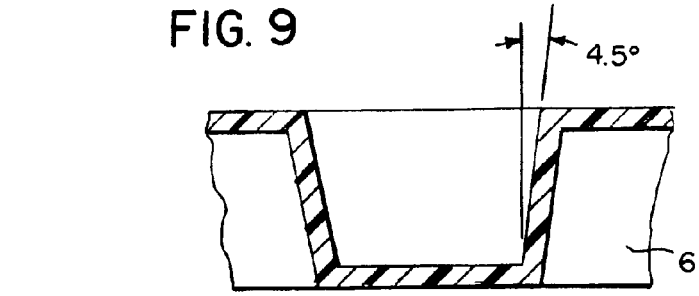
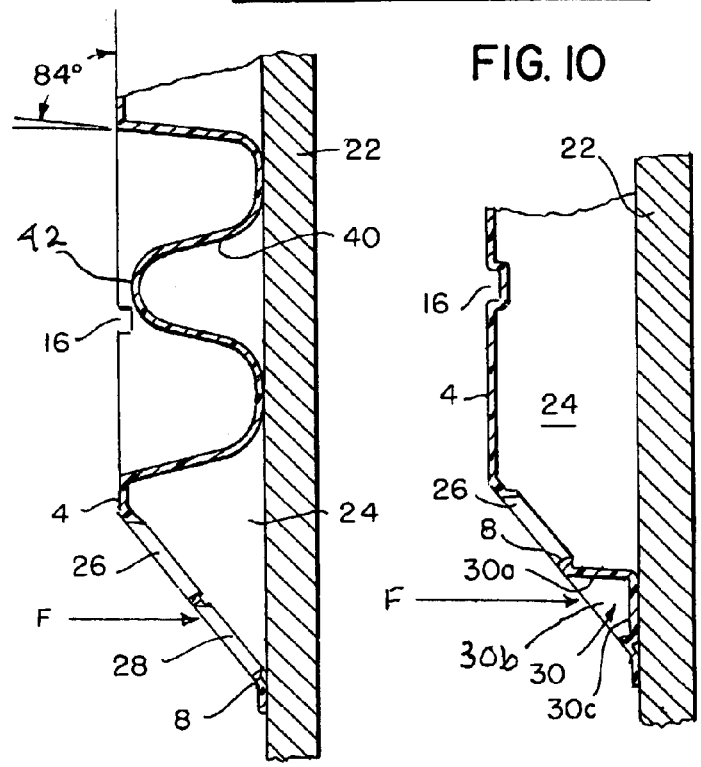
FIG. 6 FIG. 7 FIG. 8 FIG. 9 FIG. 10

AIR RETURN BULKHEAD

This application is a continuation of U.S. patent application Ser. No. 09/522,851, filed Mar. 10, 2000 now abandoned the contents of which are incorporated by reference herein.

BACKGROUND OF THE INVENTION

1. Field of the Invention

This invention relates to an improved air return bulkhead for refrigeration vehicles, including a unitary body member formed from synthetic plastic material and having top, side, and apertured bottom walls that cooperate with a vertical first wall and with an internal surface of the front wall of the refrigeration vehicle to define a plenum chamber, characterized by the provision of support means on the internal surface of the apertured bottom wall in downwardly spaced relation to the bottom edge of the front wall, said support means being arranged to engage the vehicle front wall to which the bulkhead is fastened.

2. Brief Description of the Prior Art

Air return bulkheads are known in the patented prior art, as evidenced by the Severson U.S. Pat. No. 4,399,737, Henning, et al., U.S. Pat. Nos. 5,769,704 and 5,947,812, and Onken U.S. Pat. Nos. 5,807,046 and 5,993,310, among others. These air return bulkheads are generally formed from fiberglass or a synthetic plastic material and are fastened to the inner surface of the front wall of a refrigeration vehicle having a refrigeration unit mounted in an opening contained in the upper portion of the front wall. The air return bulkheads normally protect and cooperate with the front wall on which they are mounted to define a plenum chamber into which air is introduced via apertures contained in the bottom walls of the bulkheads. The air—which is filtered by the apertures to remove the waste particles present in the container chamber—is directed upwardly toward the air inlet of the refrigeration unit. It is conventional in the art to provide such bulkheads at their lower ends a plurality of integral vertically-arranged horizontally-spaced forwardly-protruding pallet stops that prevent the pallets and the loads carried thereby from damaging the bulkheads and from blocking the air inlet apertures formed in the bottom walls of the air return bulkheads.

As shown by the Morgan U.S. Pat. No. 4,495,857, it has similarly been proposed to provide a labyrinth ventilator for marine cargo containers that is formed as a unitary body from a synthetic plastic material, which ventilator includes a plenum chamber that is in communication with inlet openings that supply ventilating air to the container. In this Morgan patent, the bottom wall contains a plurality of apertures for admitting air into the plenum chamber, and support means are provided for engaging the associated container wall to support the vertical front wall of the ventilator. Similar support means are formed as recesses or flutes contained in the planar front wall of the air return bulkheads of the aforementioned Onken patents.

The concept of cutting an article to size along predetermined lines of cut is disclosed in the Belk U.S. Pat. No. 2,909,234, Cantieri U.S. Pat. No. 4,279,439, and the Onken patents, and the provision of cutting guide grooves per se is disclosed in the Graves, et al., U.S. Pat. No. 4,539,239, and Horiki, et al., U.S. Pat. No. 5,164,238. Finally, it is well known in the art to nest or stack a plurality molded articles for economic and efficient storage and/or transport, as shown by the patents to Reynolds, et al., Reissue No. 33,200, Queen, et al., U.S. Pat. No. 4,801,169, Ryan U.S. Pat. No. 5,167,433, and the Onken patents. To this end, the cooperating nesting surfaces of the articles being stacked have an angle of nesting or taper on the order of 2° or more.

The present invention was developed to provide an improved air return bulkhead of streamlined design that is more economically and efficiently produced, that effectively supports the apertured bottom wall of the bulkhead, and that avoids the provision of the unsightly forwardly protruding pallet stops.

SUMMARY OF THE INVENTION

Accordingly, a primary object of the present invention is to provide an air return bulkhead in which concealed internal support means are provided on the apertured bottom wall of the bulkhead that extend within the plenum chamber for engagement with the vertical wall of the refrigeration vehicle upon which the bulkhead is mounted. Preferably, the support means includes a plurality of horizontally spaced support members that are spaced downwardly relative to the lower edge of the front wall of the bulkhead. According to the preferred form of the invention, the supports are formed as recesses in the face of the front wall remote from the plenum chamber, each recess including a bottom wall that is parallel with the front wall for face-to-face supporting engagement with the corresponding face of the refrigeration vehicle front wall.

According to another object of the invention, the bottom wall of the air return bulkhead contains a plurality of apertures of generally square cross-sectional configuration, the apertures being arranged in a plurality of staggered horizontal rows. In this manner, the maximum volume of air is introduced into the plenum chamber via the apertures in the bottom wall of the bulkhead without the recessed supports interfering in any way with flow of air to the refrigeration unit inlets.

According to a further object of the invention, the various cooperating surfaces of the bulkheads have a stacking angle of 4.5°, thereby to permit efficient stacking or nesting of the bulkheads for storage and shipping on pallets.

BRIEF DESCRIPTION OF THE DRAWINGS

Other objects and advantages of the invention will become apparent from a study of the following specification, when viewed in conjunction with the accompanying drawings, in which:

FIG. 1 is a front elevation view of the air return bulkhead of the present invention;

FIGS. 4–10 are sectional views taken along the lines 4—4, 5—5, 6—6, 7—7, 8—8, 9—9, and 10—10, respectively, of FIG. 1.

DETAILED DESCRIPTION

Figure 3:
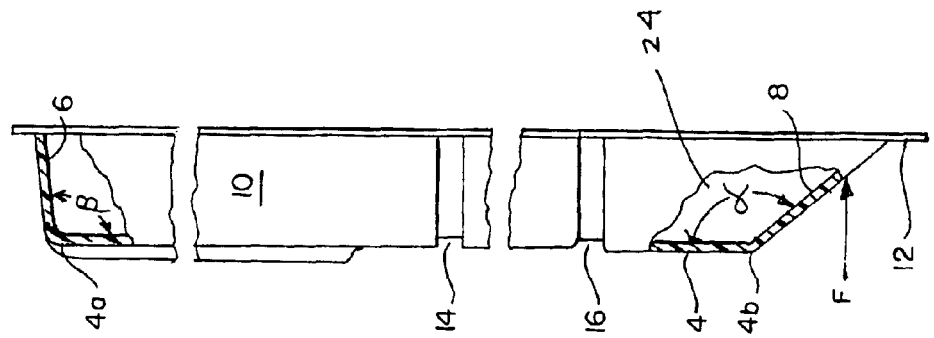
FIGS. 2 and 3 are top plan and right side elevation views, respectively, of the air return bulkhead of FIG. 1.
Figure 2:
Figure 5:
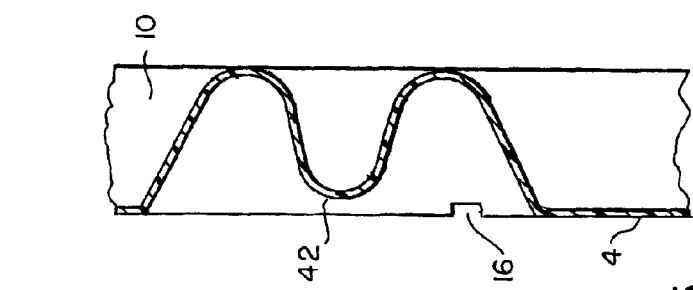
Figure 4:
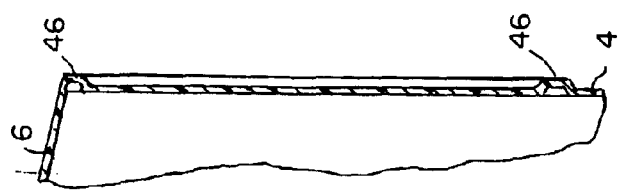

Referring first more particularly to FIG. 1, the air return bulkhead of the present invention includes a unitary body member 2 formed, by rotomolding, for example, from a suitable synthetic plastic material, such as polypropelene, polyethylene or the like. The body member includes a generally rectangular vertical first wall 4 having top, bottom and side edges 4*a*, 4*b*, and 4*c* to which are connected top, bottom, and side walls 6, 8, and 10 respectively. The body member also includes a mounting flange portion 12 that extends outwardly from the periphery of the free edges of the top, bottom and side walls of the air return bulkhead.

In accordance with the aforementioned Henning U.S. Pat. No. 5,947,812, the first wall 4 contains a pair of horizontal recesses 14 and 16 that extend transversely across the first wall 4 for receiving the mounting straps 18, 20 shown in phantom, that mount the air return bulkhead body 2 on the internal surface of the vertical front wall 22 of the refrigeration vehicle, as shown in FIGS. 1, 7 and 8. The front, top, bottom and side walls cooperate with the vehicle front wall 22 to define a plenum chamber 24 which, as will be described below, communicates with the air inlet opening of an air conditioning unit (not shown) that is supported by the vehicle front wall 22, as is known in the art.

As shown in FIGS. 3, 7, and 8, the bottom wall 8 is arranged at an obtuse internal angle α of about 135° relative to the first wall 4, which bottom wall contains two staggered rows of apertures 26 and 28. In accordance with a characterizing feature of the present invention, the bottom wall also contains a plurality of horizontally spaced support recesses 30 that are each spaced vertically downwardly from the lower edge 4b of the body member first wall 4. Each recess 30 replaces one of the corresponding bottom row apertures 28 and has a generally triangular cross-sectional configuration relative to a plane normal to the front wall 4, thereby to define a generally horizontal top wall 30a, a pair of generally vertical side walls 30b, and a vertical bottom or back wall 30c that is in face-to-face engagement with the vehicle vertical front wall 22. The support recess 30 serves to support the bottom wall 8 against horizontal impact forces F that are applied to the bottom wall by the load contained within the refrigeration vehicle.

As shown in FIG. 3, the top wall 6 is arranged at an obtuse angle β relative to the first wall 4, the angle β less than approximately 95°, thereby to give a stacking angle of less than approximately 5°. Preferably, the stacking angle is about 4.5°. Similarly, as shown in FIG. 10, the side walls of the two sets of air return baffles that 40 and 42 that direct the flow of air centrally upwardly within the plenum chamber from the inlet openings 26 and 28 toward the air inlet of the refrigeration unit have a stacking angle of less than approximately 5°. Thus, as is known in the art, as a consequence of the provision of the less than approximately 5° stacking angle, a plurality of air return bulkhead bodies 2 may be economically and efficiently stacked or nested on a pallet for shipment and storage. The arrangement and configuration of the air return baffles 40 and 42 is such as to direct the air upwardly and centrally inwardly toward the inlet of the refrigeration unit that is mounted in an opening contained in the vehicle front wall 22, as is discussed in greater detail in the aforementioned Henning U.S. Pat. No. 5,769,704.

As is well known in the art, various portions 4e, 4f of the air return bulkhead may be removed by severing along score lines 46 to permit mounting of the bulkhead with the plenum chamber in communication with the air inlet of the refrigeration unit.

The dimensions of a bulkhead are conventional and are about 7' in height by about 5' in width by about 5" in depth. The bulkhead is preferably formed by rotomolding from a moldable synthetic plastic material, such as an epoxy resin, polyurethane, a polyacrylic synthetic plastic material, or other suitable polymeric material. While the support 30 has been illustrated as being a recess, it is apparent that the support could be a solid rib or the like integral with the bottom wall 8.

While in accordance with the provisions of the Patent Statutes the preferred forms and embodiments of the invention have been illustrated and described, it will be apparent that other changes and modifications may be made without deviating from the inventive concepts set forth above.

What is claimed is:

1. An air return bulkhead adapted for use with a refrigeration vehicle having a vertical wall that carries a refrigeration unit having inlet and outlet openings, comprising
   (a) a unitary bulkhead body (2) formed of synthetic plastic material, including:
      (1) a generally-rectangular vertical first wall (4) having horizontal top (4a) and bottom (4b) edges, and a pair of vertical sides (4c) edges; and
      (2) generally-rectangular top (6), bottom (8), and side (10, 12) walls having first edges connected with the corresponding edges of said first wall, respectively, said top and side walls being generally horizontal and vertical, respectively, said top, bottom and side walls having second edges that are opposite said first edges and that are contained in a first plane that is parallel with said vertical first wall, whereby when said bulkhead body is mounted on the vehicle vertical wall with said second edges adjacent the vehicle wall, said first, top, bottom and side walls cooperate with the vehicle wall to define a plenum chamber (24) adapted for communication with the refrigeration unit inlet opening;
      (3) said bottom wall containing a plurality of inlet apertures (26, 28) for supplying air from the refrigeration vehicle into said plenum chamber, said inlet apertures being arranged in a plurality of vertically spaced horizontal rows;
      (4) said bottom wall containing a plurality of support recesses (30) that are spaced downwardly from said first wall bottom edge, said support recesses being horizontally spaced and extending generally horizontally toward and terminating adjacent said first plane, said support recesses being arranged within said lowermost row of apertures.

2. An air return bulkhead as defined in claim 1, wherein the apertures of each of said rows are staggered relative to the apertures of the adjacent row.

3. An air return bulkhead adapted for use with a refrigeration vehicle having a vertical wall that carries a refrigeration unit having inlet and outlet openings, comprising:
   (a) a bulkhead body (2) including:
      (1) a generally-rectangular vertical floating first wall (4) having horizontal top (4a) and bottom (4b) edges, and a pair of vertical side (4c) edges; and
      (2) generally-rectangular top (6), bottom (8), and side (10, 12) walls having first edges connected with the corresponding edges of said first wall, respectively, said top and side walls being generally horizontal and vertical, respectively, said bottom wall being planar and arranged at an obtuse angle (α) relative to said floating first wall, said top, bottom and side walls having second edges that are opposite said first edges and that are contained in a first plane that is parallel with said vertical first wall, whereby when said bulkhead body is mounted on the vehicle vertical wall with said second edges adjacent the vehicle wall, said first, top, bottom and side walls cooperate with the vehicle wall to define a plenum chamber (24) adapted for communication with the refrigeration unit inlet opening:
      (3) said bottom wall containing at least one inlet aperture (26, 28) for supplying air from the refrigeration vehicle into said plenum chamber;
      (4) said bottom wall containing at least one support (30) that is spaced downwardly from said first wall bottom edge, said support extending generally horizontally toward and terminating adjacent said first plane; wherein said support comprises a recess contained in said bottom wall;

said bottom wall contains a plurality of said support recesses arranged in horizontally spaced relation;

each of said support recesses has a generally triangular cross-section relative to a vertical plane normal to said first wall;

said support recess has a flat bottom wall (30c) that is vertical and parallel with said first wall, said bottom wall being arranged for face-to-face engagement with the vehicle vertical wall; and said support recess has a horizontal top wall (30a), and a pair of vertical side walls (30b).

4. An air return bulkhead for attachment to a wall of a refrigerated trailer, the bulkhead comprising:

a main wall having a rear surface adapted to face the trailer wall, a front surface, a lower edge and a remaining peripheral edge;

a lateral wall extending from at least a portion of the peripheral edge of the main wall to the trailer wall to space the main wall from the trailer wall and define a space therebetween;

a lower wall extending downward at an inclination from the lower edge of the main wall to the trailer wall, the lower wall extending generally continuously across the lower edge and being composed substantially of a series of openings for permitting air to pass through the bulkhead and into the space between the main wall and the trailer wall; and at least one support extending rearwardly from the lower wall toward the trailer wall to prevent collapse of the lower wall by abutting against the trailer wall under a load of cargo within the trailer such that the lower wall forms the outermost surface of the bulkhead below the main wall.

5. An air return bulkhead in accordance with claim 4 in which the lower wall is formed generally as a mesh of openings.

6. An air return bulkhead in accordance with claim 5 in which each of the at least one support is formed by a plurality of support walls that extend rearwardly to form a recess.

7. An air return bulkhead in accordance with claim 6 in which the support includes a first generally horizontal support wall that extends rearward from the lower wall.

8. An air return bulkhead in accordance with claim 7 in which the support further includes a second support wall that extends vertically from the first support wall to extend along the trailer wall.

9. An air return bulkhead for attachment to a wall of a refrigerated trailer, the bulkhead comprising:

a main wall having a rear surface adapted to face the trailer wall, a front surface, a lower edge and a remaining peripheral edge;

a lateral wall extending from at least a portion of the peripheral edge of the main wall to the trailer wall to space the main wall from the trailer wall and define a space therebetween;

a lower wall extending downward at an inclination from the lower edge of the main wall to the trailer wall, the lower wall being formed generally as a mesh of openings for permitting air to pass through the bulkhead and into the space between the main wall and the trailer wall; and at least one support extending rearwardly from the lower wall toward the trailer wall to prevent collapse of the lower wall under a load of cargo within the trailer such that the lower wall forms the outermost surface of the bulkhead below the main wall, wherein each of the at least one support is formed by a plurality of support walls that extend rearwardly to form a recess including a first generally horizontal support wall that extends rearward from the lower wall, a second support wall that extends vertically from the first support wall to extend along the trailer wall, and a pair of generally triangular brace walls extending between the lower wall and the trailer wall, and interconnecting with the first and second support walls.

10. An air return bulkhead in accordance with claim 4 in which the support includes at least one support wall extending between the lower wall and the trailer wall.

11. An air return bulkhead in accordance with claim 4 in which the support includes a generally horizontal support wall that extends rearward toward the trailer wall.

12. An air return bulkhead in accordance with claim 11 in which the support further includes a generally vertical support wall extending from the horizontal support wall.

13. An air return bulkhead in accordance with claim 4 further including a sidewall extending rearwardly from each of a pair of side edges of the main wall to abut the trailer wall.

14. An air return bulkhead in accordance with claim 13 wherein the bulkhead is a one-piece plastic member.

15. An air return bulkhead in accordance with claim 14 further including at least one depression in the front face of the main wall, each having a depression wall that extends toward the trailer wall to prevent collapse of the main wall against the trailer wall.

16. An air return bulkhead for attachment to a wall of a refrigerated trailer, the bulkhead comprising:

a main wall having a rear surface adapted to face the trailer wall, a front surface, an upper edge, and a lower edge;

at least one lateral wall extending from the main wall to space the rear surface of the main wall from the trailer wall to define a space therebetween;

an upper wall extending from the upper edge of the main wall toward the trailer wall;

a lower wall extending substantially continuously across the lower edge and composed substantially of a series of openings, the lower wall extending downward at an inclination from the lower edge of the main wall to the trailer wall to provide an expansive array of the openings for permitting air to pass through the bulkhead and into the space between the main wall and the trailer wall;

a plurality of small recesses spaced intermittently in mid portions of the lower wall and spaced from the main wall, each having at least one transverse wall extending toward the trailer wall to prevent collapse of the lower wall by abutting against the trailer wall under a load of cargo in the trailer.

17. An air return bulkhead in accordance with claim 16 in which the lower wall is predominately formed as a grid of a plurality of apertures.

18. An air return bulkhead in accordance with claim 17 in which the recess has a cross sectional size in the lower wall that is about the same as the size of the apertures.

19. An air return bulkhead in accordance with claim 18 wherein the bulkhead is a one-piece plastic member.

20. An air return bulkhead in accordance with claim 19 further including at least one depression in the front face of the main wall to prevent collapse of the main wall against the trailer wall.

21. An air return bulkhead in accordance with claim 16 in which the at least one transverse wall includes a generally horizontal support wall.

22. An air return bulkhead in accordance with claim 21 in which the at least one transverse wall further includes a generally vertical support wall that extends from the generally horizontal support wall to extend along the trailer wall.

23. An air return bulkhead in accordance with claim 22 in which the at least one transverse wall further includes at least one brace wall extending between the lower wall and the trailer wall, and interconnecting the horizontal and vertical support walls.

24. An air return bulkhead in accordance with claim 16 in which the at least one transverse wall includes a support wall extending between the lower wall and the trailer wall.

25. An air return bulkhead in accordance with claim 24 wherein the bulkhead is a one-piece plastic member.

26. An air return bulkhead in accordance with claim 25 further including at least one depression in the front face of the main wall, each having a depression wall extending toward the trailer wall.

27. An air return bulkhead for attachment to a wall of a refrigerated trailer, the bulkhead comprising:

a main wall having a rear surface adapted to face the trailer wall, a front surface, an upper edge, and a lower edge;

at least one lateral wall extending from the main wall to space the rear surface of the main wall from the trailer wall to define a space therebetween;

an upper wall extending from the upper edge of the main wall to the trailer wall;

a lower wall extending downward at an inclination from the lower edge of the main wall to the trailer wall, the lower wall including at least one aperture for permitting air to pass through the bulkhead an into the space between the main wall and the trailer wall; and at least one recess in the lower wall, each having at least one transverse wall extending toward the trailer wall to prevent collapse of the lower wall under a load of cargo in the trailer, wherein the at least one transverse wall includes a generally horizontal support wall, a generally vertical support wall and a brace wall generally perpendicular to the horizontal and vertical support walls, and wherein the support and brace walls are interconnected together.

28. A one-piece plastic air return bulkhead for attachment to a wall of a refrigerated trailer, the bulkhead comprising:

a main wall having a rear surface adapted to face the trailer wall, a front surface, an upper edge, a lower edge and a pair of side edges;

at least one depression in the front face of the main wall, each including a depression wall extending toward the trailer wall to prevent collapse of the main wall against the trailer wall;

a sidewall extending from each of the side edges of the main wall to space the rear surface of the main wall from the trailer wall;

an upper wall extending from the upper edge of the main wall toward the trailer wall;

a generally planar lower wall extending downward at a gradual inclination from the lower edge of the main wall to the trailer wall to form the bottom most portion of the bulkhead, the lower wall being oriented at a large obtuse angle to the rear surface of the main wall and continuous across substantially the entire lower edge and including a series of apertures forming an expansive array of inlet openings across substantially the entire lower wall for permitting air to pass through the bulkhead and into the space between the main wall and the trailer wall; and a plurality of recesses spaced intermittently in the lower wall and spaced from the main wall, each said recess having at least one transverse wall extending toward the trailer wall to prevent collapse of the lower wall by abutting the trailer wall under a load of cargo in the trailer.

29. An air return bulkhead for attachment to a wall of a refrigerated trailer, the bulkhead comprising:

a main wall having a rear surface adapted to face the trailer wall, a front surface, a lower edge and a remaining peripheral edge, the main wall being spaced from the trailer wall to define a gap therebetween;

a lower wall extending downward at an inclination from the lower edge of the main wall toward the trailer wall, the lower wall extending generally continuously across the lower edge and being composed substantially of a series of openings for permitting air to pass through the bulkhead and into the space between the main wall and the trailer wall; and a plurality of laterally spaced apart supports each extending from the lower wall at a position spaced from the lower edge of the main wall to resist cargo from being pushed to the trailer wall, wherein a portion of the openings are positioned between the supports and the main wall.

30. An air return bulkhead in accordance with claim 29 in which the main wall further includes elongated recesses each defining a longitudinal axis and including walls that extend toward the trailer wall, wherein the longitudinal axis of at least one recess is inclined toward one side of the main wall and the longitudinal axis of at least one other recess is inclined toward an opposite side of the main wall.

31. An air return bulkhead in accordance with claim 30 wherein at least one of the recesses is centrally located between the sides of the main wall and oriented generally parallel to the sides.

* * * * *